US008506139B2

(12) United States Patent
Sherman et al.

(10) Patent No.: US 8,506,139 B2
(45) Date of Patent: Aug. 13, 2013

(54) LED SPORTS BOARD

(76) Inventors: Tyler Sherman, Las Vegas, NV (US); Eric Robert Pohto, Las Vegas, NV (US)

( * ) Notice: Subject to any disclaimer, the term of this patent is extended or adjusted under 35 U.S.C. 154(b) by 179 days.

(21) Appl. No.: 13/274,144

(22) Filed: Oct. 14, 2011

(65) Prior Publication Data

US 2013/0094231 A1 Apr. 18, 2013

(51) Int. Cl.
*B60Q 1/00* (2006.01)
*B60Q 3/00* (2006.01)

(52) U.S. Cl.
USPC .......................................................... 362/486

(58) Field of Classification Search
USPC ............... 362/249.02, 253, 311.02, 459, 458, 362/486, 555, 800; 280/11.203, 87.042, 280/600–601
See application file for complete search history.

(56) References Cited

U.S. PATENT DOCUMENTS 5,132,883 A * 7/1992 La Lumandier .............. 362/466

* cited by examiner

*Primary Examiner* — Jason Moon Han
(74) *Attorney, Agent, or Firm* — Clement Cheng, Esq.

(57) ABSTRACT

An illuminated sports board has: a top sheet having a board top surface; a core layer having an optional longitudinal groove; an LED strip can be mounted at least partially within the longitudinal groove; a battery housing mounted on a top surface of the board. A switch is mounted to the battery housing. A first terminal is formed as an aperture mounted to the board top surface. The LED strip is mounted below the top sheet. A first terminal conductor is electrically connecting the first terminal to the LED layer. A second terminal is formed as an aperture mounted to the board top surface. A second terminal conductor electrically connects the second terminal to the LED layer. A first bolt makes electrical connection between the first terminal and the battery housing. A second bolt makes electrical connection between the second terminal and the switch.

18 Claims, 3 Drawing Sheets

LED SPORTS BOARD

FIELD OF THE INVENTION

The present invention is in the field of lighted recreational boards such as snowboards, skis, and water boards.

DISCUSSION OF RELATED ART

A variety of different sports boards have included lights such as light emitting diodes (LED's) installed for decorative or functional effect. A variety of different snowboards have been retrofit so that they have illuminated elements. Additionally, a variety of different sports boards have illuminated elements attached as modules to the board. For example, there are a wide variety of different LED adhesive lights that can be attached to exterior surfaces of sports boards by contact adhesive.

SUMMARY OF THE INVENTION

An illuminated sports board has: a top sheet having a board top surface; a core layer having an optional longitudinal groove; an LED strip can be mounted at least partially within the longitudinal groove; a battery housing mounted on a top surface of the board. A switch is mounted to the battery housing. A first terminal is formed as an aperture mounted to the board top surface. The LED strip is mounted below the top sheet. A first terminal conductor is electrically connecting the first terminal to the LED layer.

A second terminal is formed as an aperture mounted to the board top surface. A second terminal conductor electrically connects the second terminal to the LED layer. A first bolt makes electrical connection between the first terminal and the battery housing. A second bolt makes electrical connection between the second terminal and the switch. A fiberglass layer is bonded to an underside of the LED layer. A rubber foil mounted to the fiberglass layer.

An edge is mounted to the rubber foil. The fiberglass layer is preferably transparent. A pushbutton is mounted to the switch for actuating the switch. A switch guard is mounted over the pushbutton. The sports board has at least eight front terminal conductors including four front left terminal conductors and four front right terminal conductors. The sports board has at least eight rear terminal conductors including four rear left terminal conductors and four rear right terminal conductors.

The first bolt electrically connects to a battery housing bracket that is electrically connected to the battery housing, and wherein the second bolt electrically connects a switch bracket that is electrically connected to the switch. The top sheet is bonded to a top fiberglass layer. The top fiberglass layer is bonded to a core and the core is bonded to an LED layer. The fiberglass layer is a bottom fiberglass layer which is bonded to the LED layer. The bottom fiberglass layer is bonded to a base layer. The switch is a dimming switch that provides variable output voltage.

The following call out list of elements can be a useful guide in referencing the elements of the drawings.

21 Top Sheet
22 Fiberglass Layer
23 Core
24 Led Layer
25 Fiberglass Layer
26 Rubber Foil Layer
27 Edge
28 Base Layer
123 Core
124 Led Sheet Or Strip
125 Fiberglass Layer
126 Rubber Foil Layer
127 Edge
128 Base Layer
31 Nose
32 Top Surface
33 Tail
34 Led Strip
35 Left Terminal Conductor
36 Right Terminal Conductor
135 Rear Right Terminal Conductor
136 Rear Left Terminal Conductor
40 Switch Assembly
41 Switch Guard
42 Switch Bracket
43 Switch Bracket Opening
44 Switch Bracket Thread
45 Switch
46 Switch Spring
47 Switch Thread
48 Switch Button
49 Battery Thread
50 Battery Housing
51 Battery Housing Cap
52 Cap Thread
53 Cap Thread Receiver
54 Battery Housing Bracket
55 Battery Housing Body
56 Cap Spring
57 Battery Housing Bolt
58 Switch Bracket Bolt
61 First Terminal
62 Second Terminal

DETAILED DESCRIPTION OF THE PREFERRED EMBODIMENT

The present invention is made in a plurality of sheets laminated together for strength. The present invention uses illumination designs in board sports. Light emitting diodes can be installed in layers during the manufacturing process to produce an illuminating effect to the base, sidewalls, or top sheet of the board. The device includes a custom-designed printed circuit board or sheet having conductive materials which is layered with other layers of a sports board during the manufacturing process for achieving illumination of the board. A variety of different layers can be made transparent or translucent, with printed graphics also being partially transparent. The present invention can be manufactured using standard manufacturing equipment known in the industry including a CNC machine for cutting parts, a press for assembly lamination, and other commonly available shop tools such as waxers, routers, edge grinders and band saws.

The current from the power module or power cell goes through a switching circuit to a variable resistor to control light output. The current then passes through screws to binding posts. The binding posts are in electrical connection with a conductor. The conductor is electrically connected to the circuit board or sheet. From the LED strip or sheet, it then goes through the resistors and finally to the lamp elements to produce light through the entire or desired portion of the sports board. The illumination system relies upon the printed circuit board strip having conductive properties that is very thin yet durable and can be layered between different materials of the recreational board to emit light. The power supply is mounted to the top of the board.

Figure 1:
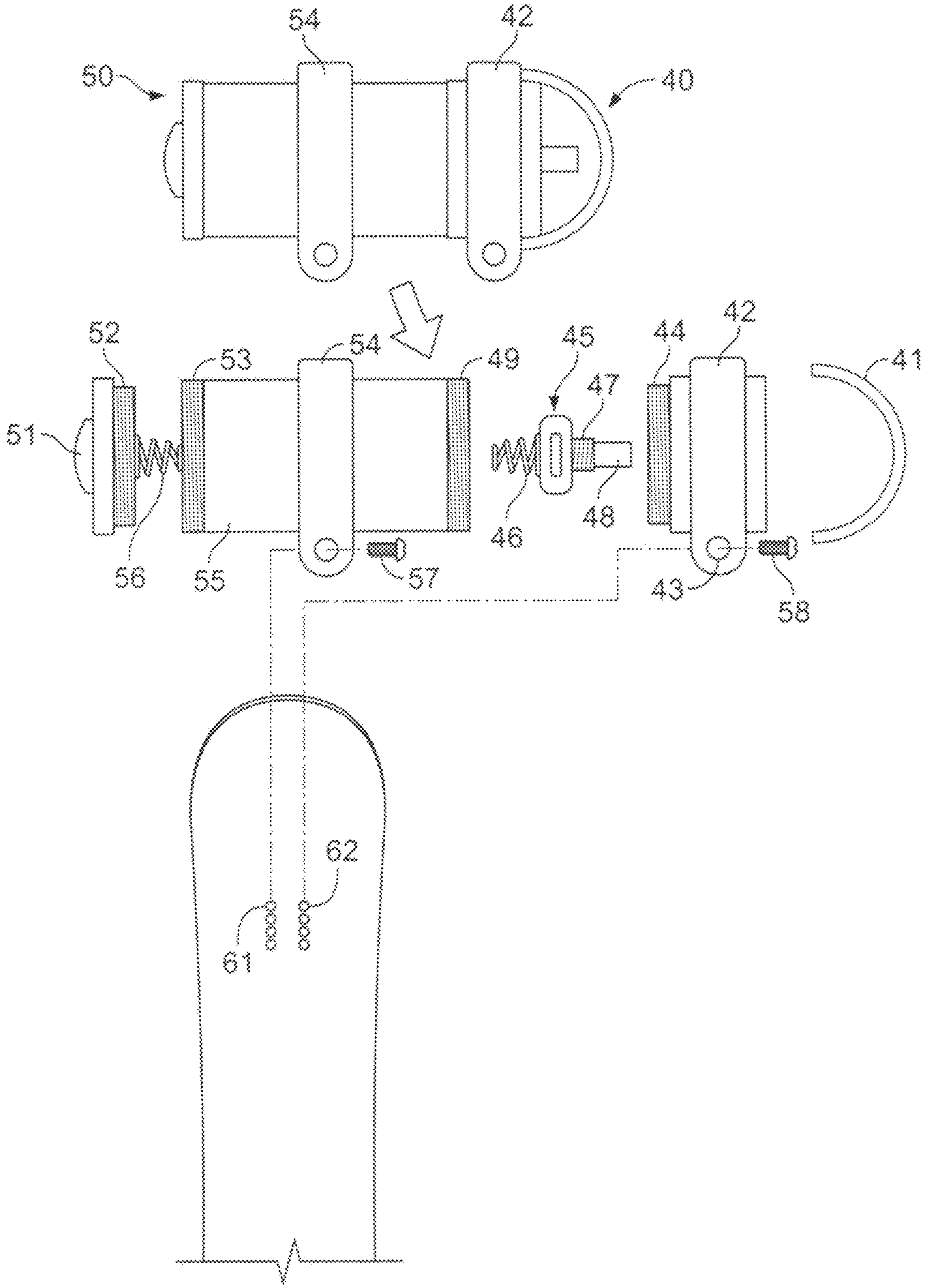
FIG. 1 is an exploded view of the mounting of the electrical switch and battery housing of the present invention.

The lighted sports board has a battery assembly having a battery housing 50, FIG. 1. The battery housing 50 has a battery housing cap 51. The battery housing 50 can be made as a tubular member and also have a cap thread 52 that engages with a cap thread receiver 53 which is similarly screwed together for waterproof connection. An elastomeric seal may provide waterproof ceiling of the cap thread receiver 53 to the cap thread 52. The tubular body of the battery housing comprises the battery housing body 55 which can be sized to receive a cylindrical shaped battery. The battery housing body 55 has threaded connection with the battery housing cap 51. A cap spring 58 provides electrical connection to the battery to provide electricity to the terminal. A battery housing bracket 54 may allow a bolt 57 to secure the battery housing body 55 to the first terminal 61. The battery housing bolt 57 and the switch bracket bolt 58 connect to terminals on the board.

A second terminal 62 can be connected to a switch bracket bolt 58. The switch bracket bolt 58 fits within a switch bracket opening 43. The switch bracket opening 43 is disposed on the switch bracket 42. Optionally, a switch guard 41 hinders accidental activation of the switch. The switch bracket 42 is preferably made of metal and loops around the switch enclosure. The switch enclosure has a switch bracket thread 44 to engage with bracket thread 49. Bracket thread 49 is disposed on the battery housing body 55. The switch enclosure is electrically insulated from the battery housing body.

The switch assembly 40 includes a switch 45, and a switch spring 46 mounted on the switch 45. The switch 45 has switch thread 47 which connects to a switch enclosure. The switch button 48 is mounted to the switch 45. The switch button 48 may further include a microcontroller or chip for controlling light output intermittently.

An electrical connection is made from a first terminal of the battery to begin an electrical circuit that eventually travels to the second terminal of the battery. The first battery terminal is connected to the cap spring 56 which is connected to the battery housing cap 51. The battery housing cap 51 is electrically connected to the cap thread 52 which is electrically connected to the cap thread receiver 53. The cap thread receiver 53 is electrically connected to the battery housing body 55, which is electrically connected to the battery housing bracket 54 and then to the battery housing bolt 57. The battery housing bolt 57 is electrically connected to the first terminal 61. The first terminal 61 is electrically connected to a left terminal conductor 35 which is then connected to the LED strip having LED lamp elements embedded on the strip. The lamp elements are then lit and they have electrical connection to the right terminal conductor 36 which is electrically connected to the second terminal 62. A switch bracket bolt 58 is electrically connected to the second terminal 62. The switch bracket bolt 58 is also then electrically connected to the switch bracket 42 at the switch bracket opening 43. The switch bracket 42 is electrically connected to the switch enclosure and the switch enclosure is mounted to the switch thread 47 to provide an electrical connection when the switch button 48 is depressed. The switch 45 therefore conducts electricity to the switch spring 46 when the switch 45 is activated. The switch spring 46 is electrically connected to the second terminal of the battery to complete the lighting circuit.

Figure 2:
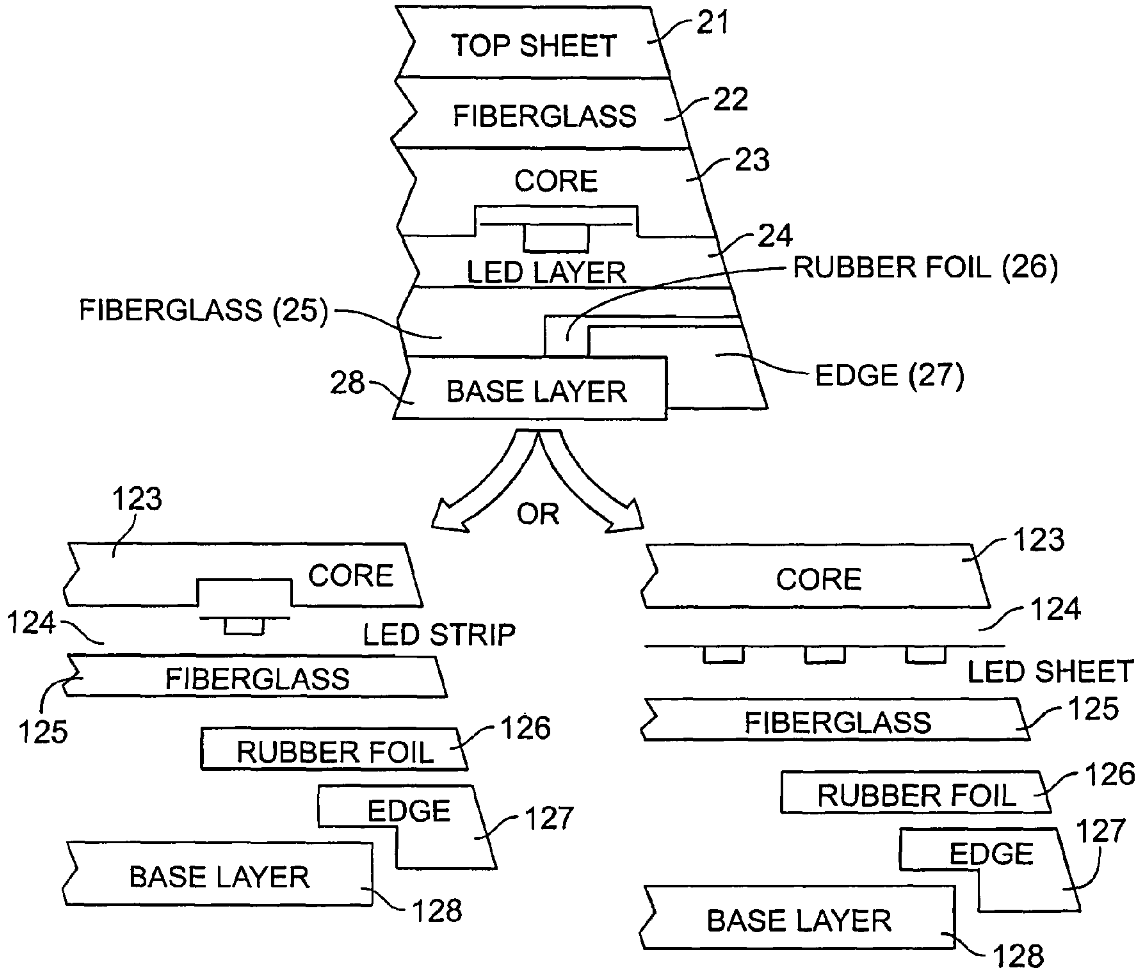
FIG. 2 is a side view diagram of the layer construction.
Figure 3:
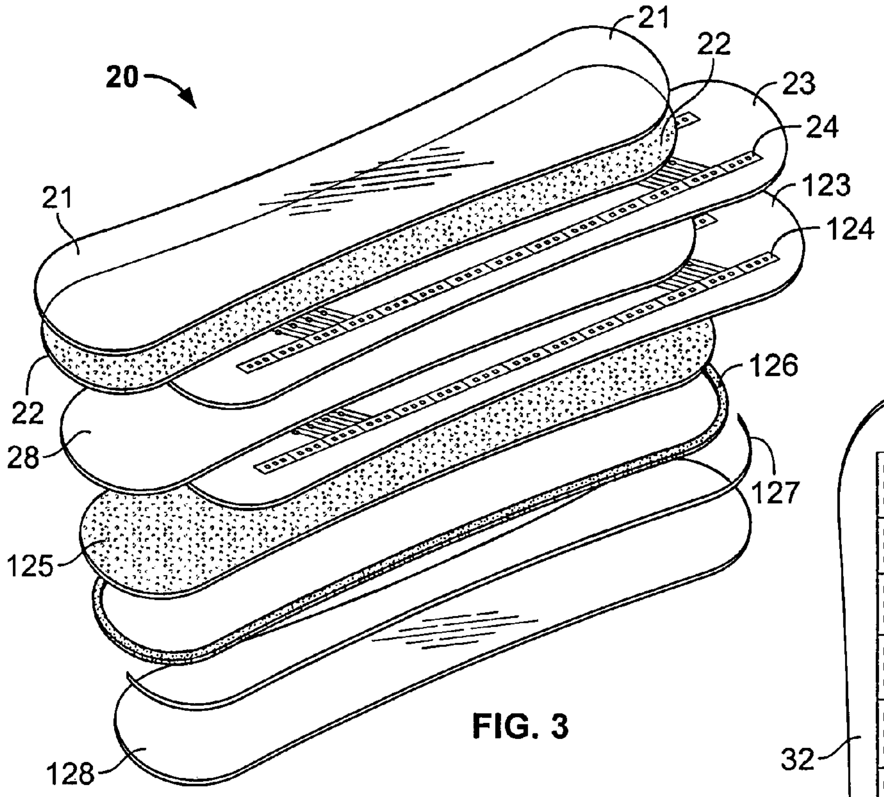
FIG. 3 is an exploded perspective view showing the different layers of the present invention.

The sports board preferably includes a top sheet 21, FIG. 2 bonded to a fiberglass sheet 22. The fiberglass sheet 22 can be made of fiberglass fabric with resin. The fiberglass sheet 22 can be made with woven or non-woven fabric. The fiberglass sheet is bonded to a core 23. The core 23 can be made of wood, carbon fiber, or polymer. The core can be bonded to an LED layer which can be an LED strip encapsulated within a resin. The core can receive a groove for retaining a portion of an LED layer, such as a protrusion of the LED layer. The LED strips can have diodes mounted to shine sideways from the middle centerline of the LED strip.

The sports board can also be made with a core 123 having a groove in the core to allow the LED strip 124 to fit completely within the core layer such that the core layer can be bonded to a fiberglass layer 125. The fiberglass layer 125 is bonded to a rubber foil 126 and an edge 127 is bonded to the rubber foil 126. The edge is mounted on a base layer 128. The edge acts as a blade for handling on snow when the sports board is a snowboard. The edge can be omitted on water sports board, or the edge can be made as a rounded plastic member instead of a metal member having an angle.

The sports board can also be made with a core 123 not having a groove in the core and the LED sheet 124 is bonded to the core layer such that the core layer can be bonded to a fiberglass layer 125. The fiberglass layer 125 is bonded to a rubber foil 126 and an edge 127 is bonded to the rubber foil 126. The edge is mounted on a base layer 128. The edge acts as a blade for handling on snow when the sports board is a snowboard. The edge can be omitted on water sports board, or the edge can be made as a rounded plastic member instead of a metal member having an angle.

During assembly, the sports board 20 may have a plurality of laminate features. The top sheet 21 is preferably made in a clear plastic sheet. The fiberglass backing layer 22 can also be made with a transparent design. The LED layer 24 can be embedded within the core 23. The base layer 28 can be bonded to both the top core 23 and the lower core 123.

Figure 4:
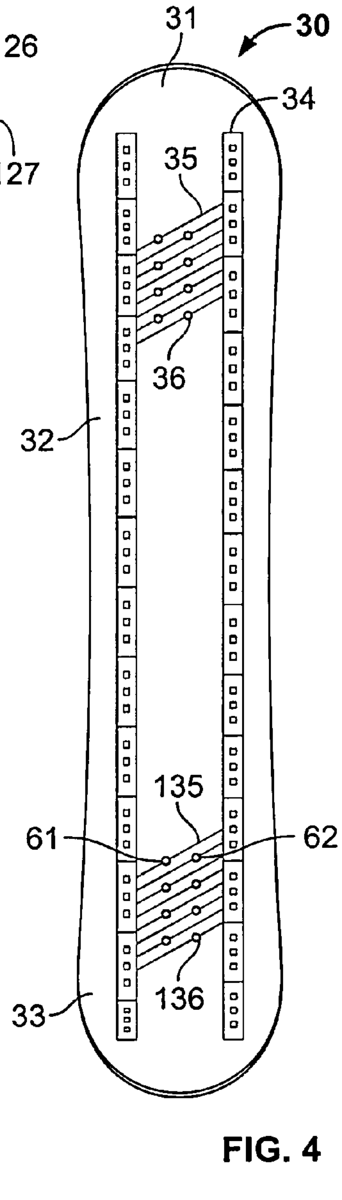
FIG. 4 is a top view of the present invention showing a layout of the LED light elements.

The nose 31 FIG. 4 opposes the tail 33. The rear right terminal conductor 135 and the rear left terminal conductor 136 can be straight and diagonally oriented. It is preferred that a plurality of far right terminal conductors and front left terminal conductors are

The invention claimed is:

1. An illuminated sports board comprising:

a. a top sheet having a board top surface;

b. a core layer;

c. an LED layer mounted below the top sheet;

d. a battery housing mounted on a top surface of the board;

e. a switch mounted to the battery housing;

f. a first terminal formed as an aperture mounted to the board top surface;

g. a first terminal conductor electrically connecting the first terminal to the LED layer;

h. a second terminal formed as an aperture mounted to the board top surface;

i. a second terminal conductor electrically connecting the second terminal to the LED layer;

j. a first bolt making electrical connection between the first terminal and the battery housing; and k. a second bolt making electrical connection between the second terminal and the switch.

2. The illuminated sports board of claim 1, further comprising:

a. a fiberglass layer bonded to underside of the LED layer.

3. The illuminated sports board of claim 2, further comprising:

a. a rubber foil mounted to the fiberglass layer; and b. an edge mounted to the rubber foil.

4. The illuminated sports board of claim 2, further comprising:

a. a pushbutton mounted to the switch for actuating the switch.

5. The illuminated sports board of claim 4, further comprising:

a. a switch guard mounted over the pushbutton.

6. The illuminated sports board of claim 2, wherein the sports board has at least eight front terminal conductors including four front left terminal conductors and four front right terminal conductors.

7. The illuminated sports board of claim 2, wherein the sports board has at least eight rear terminal conductors including four rear left terminal conductors and four rear right terminal conductors.

8. The illuminated sports board of claim 2, wherein the top sheet is bonded to a top fiberglass layer, wherein the top fiberglass layer is bonded to a core, wherein the core is bonded to an LED layer, wherein the fiberglass layer is a bottom fiberglass layer which is bonded to the LED layer, wherein the bottom fiberglass layer is bonded to a base layer.

9. The illuminated sports board of claim 8, wherein the switch is a dimming switch that provides variable output voltage.

10. An illuminated sports board comprising:

a. a top sheet having a board top surface;

b. a core layer having a longitudinal groove;

c. an LED layer mounted at least partially within the longitudinal groove, wherein the LED layer is mounted below the top sheet;

d. a battery housing mounted on a top surface of the board;

e. a switch mounted to the battery housing;

f. a first terminal formed as an aperture mounted to the board top surface;

g. a first terminal conductor electrically connecting the first terminal to the LED layer;

h. a second terminal formed as an aperture mounted to the board top surface;

i. a second terminal conductor electrically connecting the second terminal to the LED layer;

j. a first bolt making electrical connection between the first terminal and the battery housing; and k. a second bolt making electrical connection between the second terminal and the switch;

l. a fiberglass layer bonded to underside of the LED layer;

m. a rubber foil mounted to the fiberglass layer; and n. an edge mounted to the rubber foil.

11. The illuminated sports board of claim 10, wherein the fiberglass layer is transparent.

12. The illuminated sports board of claim 11, further comprising:

a. a pushbutton mounted to the switch for actuating the switch.

13. The illuminated sports board of claim 11, further comprising:

a. a switch guard mounted over the pushbutton.

14. The illuminated sports board of claim 11, wherein the sports board has at least eight front terminal conductors including four front left terminal conductors and four front right terminal conductors.

15. The illuminated sports board of claim 11, wherein the sports board has at least eight rear terminal conductors including four rear left terminal conductors and four rear right terminal conductors.

16. The illuminated sports board of claim 11, wherein the first bolt electrically connects to a battery housing bracket that is electrically connected to the battery housing, and wherein the second bolt electrically connects a switch bracket that is electrically connected to the switch.

17. The illuminated sports board of claim 11, wherein the top sheet is bonded to a top fiberglass layer, wherein the top fiberglass layer is bonded to a core, wherein the core is bonded to an LED layer, wherein the fiberglass layer is a bottom fiberglass layer which is bonded to the LED layer, wherein the bottom fiberglass layer is bonded to a base layer.

18. The illuminated sports board of claim 11, wherein the switch is a dimming switch that provides variable output voltage.

* * * * *